United States Patent [19]
Metz et al.

[11] Patent Number: 5,292,816
[45] Date of Patent: Mar. 8, 1994

[54] PLASTIC MATERIALS MADE OF HETEROGENEOUS COPOLYMERS OF VINYLIDENE FLUORIDE AND CHLOROTRIFLUOROETHYLENE, USE AND PROCESS OF MANUFACTURE

[75] Inventors: Jean-Yves Metz; Paul Plissart, both of Brussels, Belgium

[73] Assignee: SOLVAY (Société Anonyme), Brussels, Belgium

[21] Appl. No.: 11,203

[22] Filed: Jan. 29, 1993

[30] Foreign Application Priority Data

Feb. 5, 1992 [BE] Belgium .............................. 09200123

[51] Int. Cl.$^5$ ............................................ C08F 259/00
[52] U.S. Cl. ...................................... 525/276; 526/249
[58] Field of Search ......................... 526/249; 525/276

[56] References Cited

U.S. PATENT DOCUMENTS 2,752,331  6/1956  Dittman et al. .
4,851,479  7/1989  Blaise et al. .
4,946,900  8/1990  Blaise et al. .

FOREIGN PATENT DOCUMENTS 51-149392  12/1976  Japan .

*Primary Examiner*—Joseph L. Schofer
*Assistant Examiner*—N. Sarofim
*Attorney, Agent, or Firm*—Spencer, Frank & Schneider

[57] ABSTRACT

The invention relates to new plastic materials made of heterogeneous copolymers of vinylidene fluoride and chlorotrifluoroethylene, consisting of elastomeric nodules of heterogeneous copolymers of vinylidene fluoride and chlorotrifluoroethylene which are dispersed in a crystalline continuous phase of quasi vinylidene fluoride polymer.

According to another feature, the plastic materials are made of heterogeneous copolymers containing overall approximately from 10 to 22% by weight of CTFE and exhibiting a melting temperature of at least 165° C. and a flexural elasticity modulus of not more than 1000 MPa. The heterogeneous copolymers are obtained by a radical copolymerisation in aqueous medium, all of the comonomers being introduced at the beginning of the copolymerisation.

The plastic materials can be employed for the manufacture of flexible articles such as flexible tubular articles, sheathing for cables, coatings and films.

7 Claims, 2 Drawing Sheets

PLASTIC MATERIALS MADE OF HETEROGENEOUS COPOLYMERS OF VINYLIDENE FLUORIDE AND CHLOROTRIFLUOROETHYLENE, USE AND PROCESS OF MANUFACTURE

The present invention relates to new plastic materials made of heterogeneous copolymers of vinylidene fluoride and chlorotrifluoroethylene, exhibiting an optimum compromise between the melting temperature and flexibility and their use, and to a process for manufacturing the heterogeneous copolymers.

Polyvinylidene fluoride is a polymer which is known, in particular, for its high chemical inertness and resistance to ultraviolet rays, which are associated with an excellent mechanical strength. Nevertheless, it presents the disadvantage of lacking flexibility, and this limits its use in fields where this property is required, such as, for example, tubular materials intended to be wound or sheathing for electrical cables.

It is known to improve the flexibility of polyvinylidene fluoride (PVDF) by incorporation of monomer units derived from halogenated comonomers such as, for example, chlorotrifluoroethylene.

Japanese patent application JA-A-51149392 (Kureha) discloses the manufacture of homogeneous thermoplastic copolymers of vinylidene fluoride ($VF_2$) and of chlorotrifluoroethylene (CTFE), containing of the order of 2 to 15% by weight of chlorotrifluoroethylene, by copolymerisation with delayed and modulated injection of CTFE into all of the $VF_2$, so as to take into account the relative reactivity of $VF_2$ and of CTFE. The resulting homogeneous copolymers exhibit a flexibility which is increased when compared with PVDF, but their melting temperature is markedly lower than that of PVDF, and this constitutes a serious disadvantage.

Patent application EP-A-0280591 (Atochem) describes heterogeneous copolymers of $VF_2$ and of CTFE containing overall of the order of 5 to 15% by weight of CTFE, which have higher melting points than the corresponding homogeneous copolymers with the same CTFE content. These heterogeneous copolymers are characterised essentially in that the heterogeneous structure of the particles is made up of nodules of a homogeneous elastomeric copolymer of $VF_2$ and of CTFE, representing from 55 to 10% by weight of all the heterogeneous copolymer, these being dispersed in a matrix and chemically bonded thereto, which matrix is made of a quasi vinylidene fluoride polymer representing approximately 45 to 90% by weight of all of the heterogeneous copolymer. The heterogeneity of the $VF_2$-CTFE copolymers of the prior art therefore originates essentially from the dispersion of nodules of homogeneous elastomeric $VF_2$-CTFE copolymer in a matrix made up of quasi vinylidene fluoride polymer. The manufacture of such heterogeneous copolymers necessarily comprises two copolymerisation stages, namely a stage of copolymerisation of VF and of CTFE which must be performed with delayed and modulated injection of CTFE and a separate stage during which essentially $VF_2$ is polymerised. Such a copolymerisation process requires plant equipment provided with devices for the delayed and controlled injection of CTFE. Furthermore, it has been observed that the heterogeneous copolymers of the prior art do not offer an optimum compromise between the melting temperature and flexibility.

The present invention is intended to provide new plastic materials made of new heterogeneous copolymers of $VF_2$ and CTFE which exhibit a higher melting temperature than the known heterogeneous copolymers with the same CTFE content and, furthermore, a higher melting temperature at the same degree of flexibility. It also relates to a process for the manufacture of the new heterogeneous copolymers of $VF_2$ and CTFE.

To this end, the invention provides new plastic materials made of heterogeneous copolymers of vinylidene fluoride and chlorotrifluoroethylene, characterised in that they consist of elastomeric nodules of heterogeneous copolymers of vinylidene fluoride and chlorotrifluoroethylene, representing more than 55% by weight of the plastic material, which are dispersed in a crystalline continuous phase of quasi vinylidene fluoride polymer representing at least approximately 10% by weight of the plastic material.

Elastomeric nodules of heterogeneous copolymers of $VF_2$ and CTFE are intended to denote, for the purposes of the present invention, the fraction of the plastic material which is extracted by soaking a microtome section with a thickness of 0.1 μm in methyl ethyl ketone at room temperature for 16 hours. This fraction, which constitutes the elastomeric phase containing virtually all of the CTFE in the plastic material, consists essentially of heterogeneous copolymers of $VF_2$ and CTFE, i.e. copolymers in which the polymer chains do not all have the same CTFE content.

The volume fraction of the elastomeric nodules is evaluated by image analysis (digitalization) of micrographs produced after soaking microtome sections under the abovementioned conditions. The volume fraction of the elastomeric nodules which is thus evaluated is taken as being similar to the mass fraction of the said nodules.

The size of the elastomeric nodules dispersed in the crystalline continuous phase of the plastic materials according to the invention is generally between 0.05 and 1.5 μm.

For the purposes of the present invention the quasi vinylidene fluoride polymer is intended to denote the fraction of the plastic material which is not extracted by soaking a microtome section with a thickness of 0.1 μm in methyl ethyl ketone at room temperature for 16 hours. This fraction, which constitutes the crystalline continuous phase of the plastic material, consists essentially of quasi vinylidene fluoride polymer, i.e. of $VF_2$ polymer in which the polymer chains consist essentially of $VF_2$. They may additionally contain small quantities of CTFE.

The plastic materials made of heterogeneous copolymers of $VF_2$ and CTFE according to the invention therefore differ essentially from the abovementioned materials of the prior art in that, on the one hand, the elastomeric nodules consist of heterogeneous copolymers of $VF_2$ and CTFE and, on the other hand, in that the content of elastomeric nodules is higher than 55% by weight or, in other words, in that the content of quasi vinylidene fluoride polymer does not exceed 45% by weight.

Figure 1:
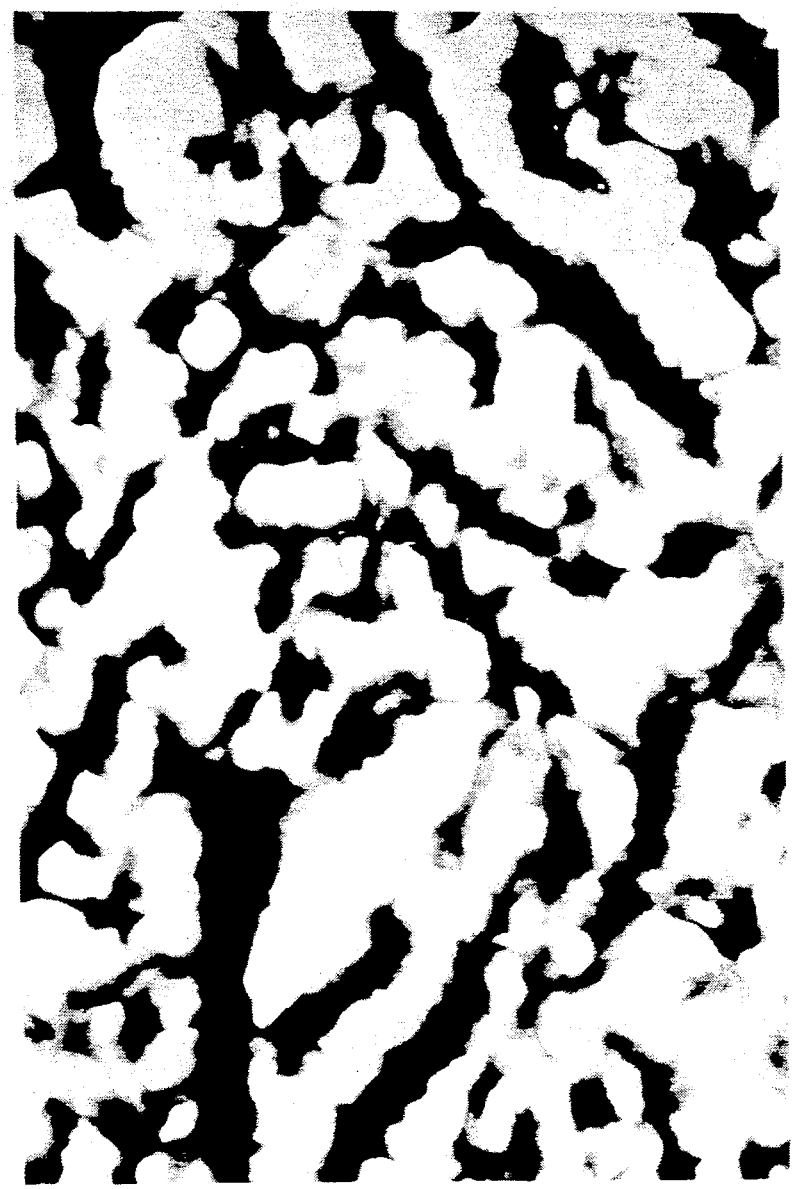
FIGS. 1 and 2 are microphotographs of elastomeric nodules of heterogeneous copolymers of vinylidene fluoride and chlorotrifluoroethylene, prepared according to examples 1 and 2.
Figure 2:
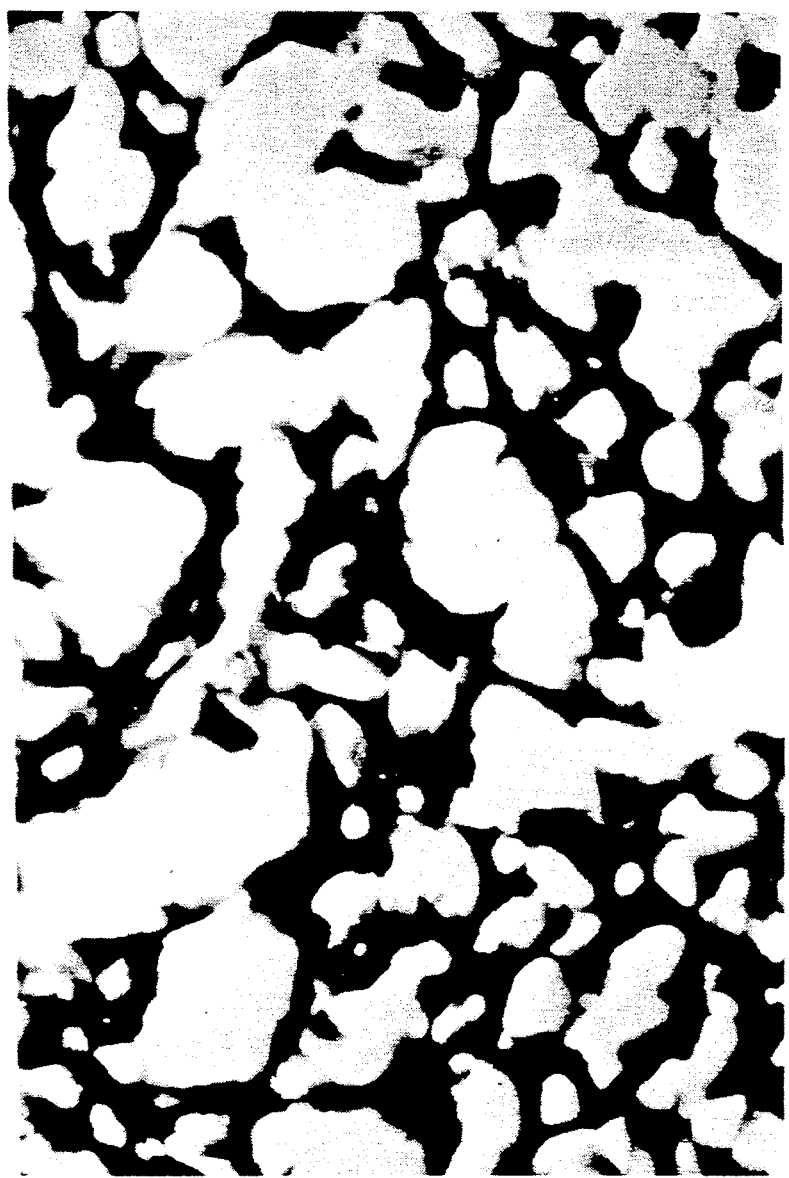

The relative content of elastomeric nodules and hence the flexibility of the plastic materials according to the invention increase with their overall CTFE content. The preferred plastic materials are the materials in which the elastomeric nodules represent more than 60% by weight and, still more particularly, more than 65% by weight of the total weight.

While it is true that, at the same overall CTFE content, the heterogeneous copolymers forming the plastic materials according to the invention have a flexibility which is slightly inferior to those of the heterogeneous copolymers of the prior art, they offer, furthermore, an optimum compromise between the melting temperature and flexibility, which cannot be obtained by the known heterogeneous copolymers.

According to another feature of the present invention, the plastic materials made of heterogeneous copolymers of vinylidene fluoride and chlorotrifluoroethylene contain overall approximately from 10 to 22% by weight of CTFE and exhibit a melting temperature (determined by differential thermal analysis) of at least 165° C. and a flexural elasticity modulus (determined according to ASTM standard D790) of not more than 1000 MPa. These plastic materials generally contain more than 55% by weight of elastomeric nodules.

Preferred plastic materials are those made of heterogeneous copolymers containing overall approximately from 12 to 20% by weight of CTFE, which exhibit a melting temperature of at least 165° C. and a flexural elasticity modulus of not more than 750 MPa. These preferred plastic materials generally contain more than 60% by weight of elastomeric nodules.

Plastic materials which are very particularly preferred are those made of heterogeneous copolymers containing overall approximately from 14 to 17% by weight of CTFE, which have a melting temperature of at least 165° C. and a flexural elasticity modulus not exceeding 650 MPa. These particularly preferred plastic materials generally contain not more than 65% by weight of elastomeric nodules.

Preference is given, furthermore, to plastic materials made of heterogeneous copolymers of $VF_2$ and CTFE whose elasticity modulus is at least 150 MPa and, still more particularly, at least 200 MPa.

Plastic materials which are very particularly preferred are those made of heterogeneous copolymers of $VF_2$ and CTFE which contain overall approximately from 14 to 17% by weight of CTFE and have a melting temperature of at least 165° C. and a flexural elasticity modulus of between 650 and 200 MPa. These latter very particularly preferred plastic materials have an embrittlement temperature (measured according to ASTM standard D746 A) situated in the region of −40° C.

The present invention also relates to a process for the manufacture of the heterogeneous copolymers of $VF_2$ and CTFE which make up the plastic materials according to the invention. These heterogeneous copolymers can be produced by a simplified single-stage process which makes plants for the modulated introduction of CTFE during copolymerisation completely redundant.

For this purpose, the invention also relates to a process for the manufacture of heterogeneous copolymers by copolymerisation of $VF_2$ and CTFE, characterised in that It $VF_2$ and CTFE are copolymerised in aqueous dispersion with the use of radical polymerisation initiators, all of the two comonomers being introduced at the beginning of the copolymerisation.

An essential feature of the process for the manufacture of the heterogeneous copolymers lies in the introduction of all of the two comonomers at the beginning of the copolymerisation.

Copolymerisation in aqueous dispersion is intended to denote any of the usual techniques of polymerisation in which the (co)monomers are dispersed in a liquid aqueous phase, such as so-called aqueous emulsion polymerisation which is performed with the use of water-soluble radical initiators and in the presence of emulsifying agents and the so-called aqueous suspension polymerisation which is performed with the use of oil-soluble radical initiators and in the presence of dispersing agents. Preference is given to aqueous suspension copolymerisation. The aqueous suspension polymerisation can be initiated with the use of the usual oil-soluble initiators of radical polymerisation. Representative examples of such initiators are dialkyl peroxydicarbonates, acetyl cyclohexanesulphonyl peroxide, dibenzoyl peroxide, dicumyl peroxide, t-alkyl perbenzoates and t-alkyl perpivalates. Nevertheless, preference is given to dialkyl peroxydicarbonates such as diethyl, dipropyl and diisopropyl peroxydicarbonates and to t-alkyl perpivalates such as t-butyl and t-amyl perpivalates and, still more particularly, to dialkyl peroxydicarbonates.

The initiator can be introduced wholly at the beginning of the copolymerisation or in portions or continuously in the course of the copolymerisation. The quantity of oil-soluble initiator is generally between approximately 0.05 and 3% by weight relative to the monomers introduced.

The dispersing agent used in aqueous suspension polymerisation can also be chosen indiscriminately from the usual dispersing agents employed in radical polymerisation in an aqueous suspending medium, such as, for example, polyvinyl alcohols and water-soluble cellulose ethers such as alkyl and alkyl hydroxyalkyl celluloses. Nevertheless, preference is given to water-soluble cellulose ethers. By way of examples of such cellulose ethers there may be mentioned methyl celluloses, ethyl hydroxyethyl celluloses and methyl hydroxypropyl celluloses.

The copolymerisation can be performed in the presence of molecular mass regulators. By way of examples of such known regulators which can be employed for the aqueous suspension copolymerisation of $VF_2$ and CTFE there may be mentioned ketones containing from three to four carbon atoms, saturated alcohols containing from three to six carbon atoms, dialkyl carbonates in which the alkyl groups contain not more than five carbon atoms. When a molecular mass regulator is used, it is used in usual quantities. To give an idea, the molecular mass regulators are generally used in a proportion of approximately 0.5 to 5% by weight relative to the comonomers introduced.

The polymerisation temperature usually lies between 35° and 100° C. This temperature range lies above the critical temperature (30.1° C.) of vinylidene fluoride. The copolymerisation is preferably performed in an aqueous suspending medium at a temperature of between 40° and 70° C. and at initial pressures of approximately 55 to 200 bars. The production efficiency of the reactors can, of course, be increased by carrying out water injections during polymerisation or raising the copolymerisation temperature. It is desirable not to interrupt the copolymerisation before the degree of conversion has reached 80% and preferably not before it has reached 90%.

The CTFE content of the mixture of comonomers introduced at the beginning of the copolymerisation will depend, of course, essentially on the desired CTFE content in the heterogeneous $VF_2$-CTFE copolymer, it being understood that the composition of the copolymer will lie proportionately closer to the composition of the mixture of comonomers introduced, the higher the degree of conversion. The mixture of comonomers introduced wholly at the beginning of the copolymerisation generally contains approximately between 10 and 22% by weight of CTFE.

The heterogeneous copolymers of $VF_2$ and CTFE which are obtained by the process of the invention are isolated, at the end of polymerisation, in conventional manner by dewatering, followed by washing and drying. They generally have a melt index, according to ASTM standard D1238, ranging from approximately 0.5 to 50 g/10 min at 230° C. under a 5-kg load. They preferably have a melt index ranging from approximately 2 to 25 g/10 min.

The plastic materials made of heterogeneous copolymers of $VF_2$ and CTFE according to the invention combine a high flexibility and melt temperature with a low embrittlement temperature, and this ensures that the flexible articles manufactured with their use have a wide range of service temperatures. As a result, they can be employed in many fields and, in particular, for sheathing electrical cables and optical fibres, for the manufacture of pipes and of flexible tubular materials intended to be wound, for cladding storage and transport containers, for the extrusion of single- or multilayer agricultural or architectural films, and the like.

The present invention also relates to the use of the plastic materials made of heterogeneous copolymers of $VF_2$ and CTFE according to the invention in the above-mentioned four fields of use.

The examples which follow are intended to illustrate the invention.

EXAMPLE 1

2 l of demineralised water and 80 ml of an aqueous solution containing 10 g/l of an ethyl hydroxyethyl cellulose are introduced into an autoclave of 3.86-liter volume, fitted with a stirring system. The content of the autoclave is purged of oxygen by a succession of applications of vacuum (residual pressure: approximately 50 mbar) and of nitrogen flushes and is then cooled to 15° C. 2.46 g of diethyl peroxydicarbonate dispersed in 50 ml of water at 15° C. and 25 g of diethyl carbonate are then introduced into it. 100 g of CTFE and then 900 g of $VF_2$ are then introduced into the autoclave; the pressure in the autoclave then reaches a value close to 30 bars. The autoclave is then heated to 65° C. When this temperature has been reached, pressurised water is introduced into the autoclave until the pressure in the autoclave reaches 80 bars. The time when this pressure &s reached is taken to be the initial moment of the copolymerisation. The drop in pressure then marks the progress of the copolymerisation. After 3 h 15 min of running, the temperature is raised to 50° C. and then, after a further 1 h 45 min, to 60° C. and is kept there for 1 hour. After 6 hours' running, the residual pressure in the autoclave is 16 bars. The autoclave is cooled to room temperature and the unconverted monomers are then degassed. After washing, dewatering and drying, 930 g of copolymer are collected in which the CTFE content measured by chlorine determination is 10.8% by weight (conversion: 93%) and which has a melt index (MI) measured at 230° C. under a 5-kg load according to ASTM standard D1238 of 14 g/10 min.

EXAMPLES 2 TO 4

The procedure is as in Example 1, except that the composition of the mixture of monomers introduced is modified while adhering to a total charge of 1 kg of monomers, to produce the heterogeneous copolymers described below.

|  | CTFE used, wt % of total monomers | $VF_2$-CTFE copolymer CTFE content, wt % | MI, g/10 min |
|---|---|---|---|
| Example 2 | 15 | 15.1 | 14 |
| Example 3 | 16 | 16.3 | 14.5 |
| Example 4 | 20 | 20.3 | 16.5 |

The heterogeneous $VF_2$-CTFE copolymers produced in Examples 1 to 4 were used to evaluate the melting temperature ($T_m$) by differential thermal analysis, the flexural elasticity modulus ($E_{flex}$) according to ASTM standard D790 and the embrittlement temperature ($T_e$) according to ASTM standard D746 A. The results of the evaluation are listed in the appended table.

The elastomeric nodule content of the plastic materials made of the heterogeneous copolymers produced in Examples 1 and 2 was also evaluated. To do this, microtome sections 0.1 μm in thickness were cut from copolymer granules. These sections were soaked in methyl ethyl ketone for 16 hours at room temperature. After soaking, the dissolved elastomeric nodules consisting essentially of CTFE-rich heterogeneous copolymers and the undissolved crystalline continuous phase consisting of quasi vinylidene fluoride polymer were displayed using electron microscopy. The volume fraction of the elastomeric nodules was evaluated by image analysis (digitalisation) of the micrographs produced at a magnification of 40,000. The micrograph 1, appended, relates to the plastic material according to Example 1, micrograph 2 relates to the plastic material according to Example 2. With the mass fraction of the elastomeric nodules assumed to be similar to the volume fraction evaluated, the weight content of elastomeric nodules of the plastic material according to Example 1 is 62–58% by weight; that of the plastic material according to Example is 70–66% by weight.

TABLE

Evaluation of the properties of the copolymers

| Example No. | CTFE content, % by weight | $T_m$ °C. | $E_{flex}$ MPa | $T_e$ °C. |
|---|---|---|---|---|
| 1 | 10.8 | 170 | 850 | −25 |
| 2 | 15.1 | 168 | 400 | −42 |
| 3 | 16.3 | 165.8 | 390 | −42 |
| 4 | 20.3 | 165.2 | 192 | −50 |

We claim:

1. A plastic material of heterogeneous copolymers of vinylidene fluoride and chlorotrifluoroethylene, the plastic material comprising elastomeric nodules of heterogeneous copolymers of vinylidene fluoride and chlorotrifluoroethylene, representing more than about 55% by weight of the plastic material, said elastomeric nodules being dispersed in a crystalline continuous phase of quasi vinylidene fluoride polymer, said quasi vinylidene fluoride polymer representing at least about 10% by weight of the plastic material.

2. The plastic material according to claim 1, wherein the elastomeric nodules represent more than 60% by weight of the plastic material.

3. The plastic material according to claim 1, wherein the elastomeric nodules represent more than 65% by weight of the plastic material.

4. A plastic material of heterogeneous copolymers of vinylidene fluoride and chlorotrifluoroethylene, the plastic material comprising elastomeric nodules of heterogeneous copolymers of vinylidene fluoride and chlorotrifluoroethylene, representing more than about 55% by weight of the plastic material, the plastic material containing overall from about 10 to 22% by weight of chlorotrifluoroethylene and exhibiting a melting temperature, determined by differential thermal analysis, of at least 165° C. and a flexural elasticity modulus, determined according to ASTM standard D790, of not more than 1000 MPa.

5. The plastic material according to claim 4, comprising more than 60% by weight of said elastic nodules, the plastic material containing overall from about 12 to 20% by weight of chlorotrifluoroethylene and exhibiting a melting temperature of at least about 165° C. and a flexural elasticity modulus of not more than about 750 MPa.

6. The plastic material according to claim 1, having a flexural elasticity modulus of at least 150 MPa.

7. The plastic material according to claim 4 having a flexural elasticity modulus of at least 150 MPa.